(12) United States Patent
Huang et al.

(10) Patent No.: US 11,174,099 B2
(45) Date of Patent: Nov. 16, 2021

(54) THRESHOLD ASSEMBLY AND CONTAINER

(71) Applicants:China International Marine Containers (Group) Ltd., CIMC R&D CENTER, Guangdong (CN); CIMC Containers Holding Company Ltd., Guangdong (CN); Taicang CIMC Reefer Logistics Equipment Co., Ltd., Jiangsu (CN)

(72) Inventors: Guohao Huang, Suzhou (CN); Weiting Yang, Suzhou (CN); Zhaoyun Ma, Suzhou (CN); Yugang Shen, Suzhou (CN); Hong Zhang, Suzhou (CN); Cuiqun Guo, Suzhou (CN)

(73) Assignees: China International Marine Containers (Group) Ltd., CIMC R&D CENTER, Shenzhen (CN); CIMC Containers Holding Company Ltd., Dongguan (CN); Taicang CIMC Reefer Logistics Equipment Co., Suzhou (CN)

( * ) Notice: Subject to any disclaimer, the term of this patent is extended or adjusted under 35 U.S.C. 154(b) by 66 days.

(21) Appl. No.: 16/551,287

(22) Filed: Aug. 26, 2019

(65) Prior Publication Data

US 2019/0375583 A1 Dec. 12, 2019

Related U.S. Application Data

(63) Continuation of application No. PCT/CN2018/072064, filed on Jan. 10, 2018.

(30) Foreign Application Priority Data

Oct. 20, 2017 (CN) .......................... 201710985476.9

(51) Int. Cl.
*B62D 25/20* (2006.01)
*B62D 33/02* (2006.01)
(Continued)

(52) U.S. Cl.
CPC ............. *B65D 90/08* (2013.01); *B62D 25/00* (2013.01); *B62D 25/2054* (2013.01); *B65D 90/008* (2013.01); *B62D 33/02* (2013.01)

(58) Field of Classification Search
CPC .... B62D 29/008; B62D 33/048; B62D 33/02; B62D 25/20; B62D 25/2054;
(Continued)

(56) References Cited

U.S. PATENT DOCUMENTS 2,430,200 A * 11/1947 Wilson .................... E04F 13/10
52/588.1
2,786,556 A * 3/1957 Constance, Jr. ..... B62D 29/008
52/588.1
(Continued)

FOREIGN PATENT DOCUMENTS

CN 2527533 Y 12/2002
CN 2878271 Y 3/2007
(Continued)

OTHER PUBLICATIONS

Machine Translation of Huang (CN 2931375) Provided by EPO Patent Translate (Year: 2021).*

*Primary Examiner* — Gideon R Weinerth
(74) *Attorney, Agent, or Firm* — Mei & Mark LLP

(57) ABSTRACT

A container comprising a threshold assembly. The threshold assembly comprises an outer end plate, a horizontal connecting member and a middle connecting member. The outer end plate comprises a horizontal portion and a vertical portion; the horizontal member connects to a floor of the container; and the middle member connects to the plate and
(Continued)

the horizontal member, wherein one end of the middle member extends to the intersection of the horizontal portion and the vertical portion of the plate; an opening and a clamping groove at the other end of the middle member; and an inserting portion at one end of the horizontal member for inserting into the clamping groove through the opening to connect the horizontal member and the middle member. When force is applied to the threshold assembly, gaps among the horizontal and middle members and the plate are sealed, preventing liquids from causing steel corrosion.

18 Claims, 7 Drawing Sheets

(51) Int. Cl.
  *B65D 90/08* (2006.01)
  *B65D 90/00* (2006.01)
  *B62D 25/00* (2006.01)

(58) Field of Classification Search
  CPC .... B62D 33/046; B62D 33/023; B62D 33/08; B62D 21/09; B62D 65/02; B65D 88/121; B65D 88/129; B65D 90/08; B65D 90/008; B65D 90/023; F25D 11/003; F25D 23/00; B60P 3/20; B60P 3/122
  USPC ............ 52/588.1, 578; 62/77; 105/422, 418, 105/419, 375; 220/693, 692, 677, 1.5; 296/181.6, 184.1, 193.07, 24.3, 186.1, 296/193.04, 29, 191, 204
  See application file for complete search history.

(56) References Cited

U.S. PATENT DOCUMENTS

| | | | | |
|---|---|---|---|---|
| 3,182,769 A * | 5/1965 | De Ridder | .............. | F16B 5/008 52/592.2 |
| 3,266,837 A * | 8/1966 | Stricker, Jr. | .......... | B62D 33/023 296/186.5 |
| 3,380,216 A * | 4/1968 | John | ....... | F16B 5/008 52/592.4 |
| 3,884,328 A * | 5/1975 | Williams | ................ | E04G 1/152 182/222 |
| 4,091,743 A * | 5/1978 | Lemon | ..................... | B60P 3/20 105/375 |
| 4,631,891 A * | 12/1986 | Donavich | .......... | B62D 25/2054 105/375 |
| 4,758,128 A * | 7/1988 | Law | ......................... | B60P 1/28 414/477 |
| 4,848,617 A | 7/1989 | Zygaj | | |
| 4,951,992 A * | 8/1990 | Hockney | ............ | B62D 25/2054 105/422 |
| 5,170,605 A * | 12/1992 | Huddle | ...................... | B60P 3/20 52/588.1 |
| 5,351,990 A * | 10/1994 | Thomas | ............. | B62D 25/2054 280/789 |
| 5,588,693 A * | 12/1996 | Higginson | ........... | B62D 33/046 296/186.1 |
| 5,772,276 A * | 6/1998 | Fetz | ................... | B62D 25/2054 296/181.2 |
| 5,934,741 A * | 8/1999 | Beukers | ............... | B62D 29/046 296/181.6 |
| 6,871,904 B2 * | 3/2005 | Bhat | .................. | B62D 25/2054 296/183.1 |
| 7,264,305 B2 * | 9/2007 | Kuriakose | .......... | B62D 25/2054 296/193.07 |
| 7,329,068 B2 * | 2/2008 | Ungurean | ............... | E01C 9/083 404/35 |
| 7,353,960 B2 * | 4/2008 | Seiter | ..................... | B61D 17/18 105/355 |
| 9,347,226 B2 * | 5/2016 | Ouellet | ............ | E04F 15/02016 |
| 10,532,778 B2 * | 1/2020 | DeMonte | ............. | B62D 27/065 |
| 2003/0079820 A1 * | 5/2003 | Palsson | ................. | E04F 15/107 156/91 |
| 2003/0084636 A1 * | 5/2003 | Pervan | ..................... | E04F 15/04 52/592.1 |
| 2005/0210810 A1 * | 9/2005 | Pervan | ..................... | E04F 15/04 52/578 |
| 2006/0059791 A1 * | 3/2006 | Conny | .................. | B62D 25/02 52/71 |
| 2006/0087152 A1 * | 4/2006 | Kuriakose | .......... | B62D 25/2054 296/184.1 |
| 2007/0102961 A1 * | 5/2007 | Lemmons | ............ | B62D 33/023 296/186.1 |
| 2019/0375583 A1 * | 12/2019 | Huang | .................. | B65D 90/08 |
| 2021/0129917 A1 * | 5/2021 | Sagarsee | ................ | B62D 25/2054 |

FOREIGN PATENT DOCUMENTS

| | | |
|---|---|---|
| CN | 2931375 Y | 8/2007 |
| CN | 201442727 U | 4/2010 |
| CN | 202368989 U | 8/2012 |
| CN | 202828608 U | 3/2013 |
| CN | 203529189 U | 4/2014 |
| CN | 109693886 A | 4/2019 |
| WO | PCT/CN2018/072064 | 1/2018 |

* cited by examiner

THRESHOLD ASSEMBLY AND CONTAINER

CROSS-REFERENCE TO RELATED APPLICATIONS

The present disclosure is a continuation of International Application No. PCT/CN2018/072064, titled "Threshold Assembly and Container," filed on Jan. 10, 2018, the entire subject matter and contents thereof are incorporated herein by reference.

TECHNICAL FIELD

The present invention relates to the technical field of containers, and more particularly, to a threshold assembly and a container.

BACKGROUND

Currently, in a common rear threshold assembly structure of a container, an aluminum threshold in a threshold assembly is fixed to a rear threshold assembly by a bolt or a screw so that a heat bridge is formed between the interior and exterior of the container, thereby resulting in heat leakage of an insulated container or a refrigerated container, and reducing the performance of the insulated container or the refrigerated container. A PVC block and the aluminum threshold in the threshold assembly are simply sealed by a sealant. But, in actual use, the rear threshold assembly is likely to deform as it is frequently rolled by a loading and unloading tool such as a forklift, which, in turn, causes the sealant between the PVC block and the aluminum threshold to disengage. As a result, steel is corroded as water or other liquids penetrate the interior of the threshold assembly. Although some threshold assemblies are designed without bolts or screws, heat leakage still occurs because there is no thermal insulation material inside the threshold assembly.

Therefore, a threshold assembly and a container are needed to at least partially solve the problems in the prior art.

SUMMARY

A series of concepts with simplified forms are introduced in this SUMMARY, which will be further described in detail in the DETAILED DESCRIPTION. The SUMMARY of the present invention is not intended to define the key features and the essential technical features of the claimed technical solutions, and is not intended to determine the protection scopes of the claimed technical solutions.

In order to solve the above problems, according to a first aspect of the present invention, a threshold assembly is provided for a container. The threshold assembly is arranged at a door end of the container, and comprises: an outer end plate comprising a horizontal portion, and a vertical portion which is arranged vertically downward at one end of the threshold assembly toward an outer side of the container from an outer side of the horizontal portion; a horizontal connecting member connected to a floor of the container; and a middle connecting member connected to the outer end plate and the horizontal connecting member.

Wherein, one end of the middle connecting member in a horizontal direction extends to a position where the horizontal portion and the vertical portion of the outer end plate intersect, and an inserting opening which opens toward the top of the horizontal connecting member, and a clamping groove which is inclined downward and toward the outer end plate from the inserting opening are arranged at the other end of the middle connecting member in the horizontal direction; and an inserting portion matched with a structure of the clamping groove is arranged at one end of the horizontal connecting member, and is capable of being inserted into the clamping groove through the inserting opening to connect the horizontal connecting member and the middle connecting member.

Optionally, the clamping groove is configured to have an approximately L-shaped vertical cross section, and comprises an inclined portion inclined downward and toward the outer end plate from the inserting opening, and a hook portion extending substantially horizontally from a lower end of the inclined portion.

Optionally, the clamping groove further comprises a step portion laterally protruding from the inclined portion to limit lateral movement of the inserting portion.

Optionally, the threshold assembly further comprises a bottom plate; and the bottom plate, the outer end plate, the horizontal connecting member and the middle connecting member form a chamber.

Optionally, the threshold assembly further comprises a cushion block which is arranged in the chamber and which is located between the horizontal connecting member and the bottom plate to support the horizontal connecting member and/or between the middle connecting member and the bottom plate to support the middle connecting member.

Optionally, the horizontal connecting member further comprises an end clamping portion arranged at the other end opposite to the inserting portion, and a middle clamping portion located at a middle position of the horizontal connecting member; and the cushion block comprises an end limiting portion abutting against the end clamping portion, and a middle limiting portion abutting against the middle clamping portion.

Optionally, the end clamping portion is configured as an L-shaped protrusion structure, and correspondingly, the end limiting portion is configured as an L-shaped stepped structure; and/or the middle clamping portion is configured as an L-shaped protrusion structure, and correspondingly, the middle limiting portion is configured as an L-shaped stepped structure.

Optionally, an elastic sealing member is arranged with at least one position of the middle connecting member abutting against the outer end plate.

Optionally, a thermal insulation material is filled among the bottom plate, the outer end plate, the horizontal connecting member and the middle connecting member.

The present invention further discloses a container, comprising the above threshold assembly, and the floor at least partially arranged above the threshold assembly.

According to the threshold assembly of the disclosure, when a forklift applies a friction force to the threshold assembly, widened gaps among the horizontal connecting member, the middle connecting member and the outer end plate are sealed, so that water or other liquid is prevented from penetrating into the interior of the threshold assembly to avoid corrosion of steel. The threshold assembly of the disclose is simple to mount during on-site construction; a heat bridge at the threshold assembly is relatively smaller, and thus the heat leakage is relatively lower; and the horizontal connecting member and the middle connecting member are mounted in a clamping manner, and form an anti-disengagement structure after being rotatably mounted in position.

BRIEF DESCRIPTION OF THE DRAWINGS

The following drawings of the present invention are herein used as a part of the present invention for understanding the present invention. Embodiments of the present invention and the descriptions thereof are illustrated in the drawings to explain devices and principles of the present invention. In the drawings.

Figure 1:
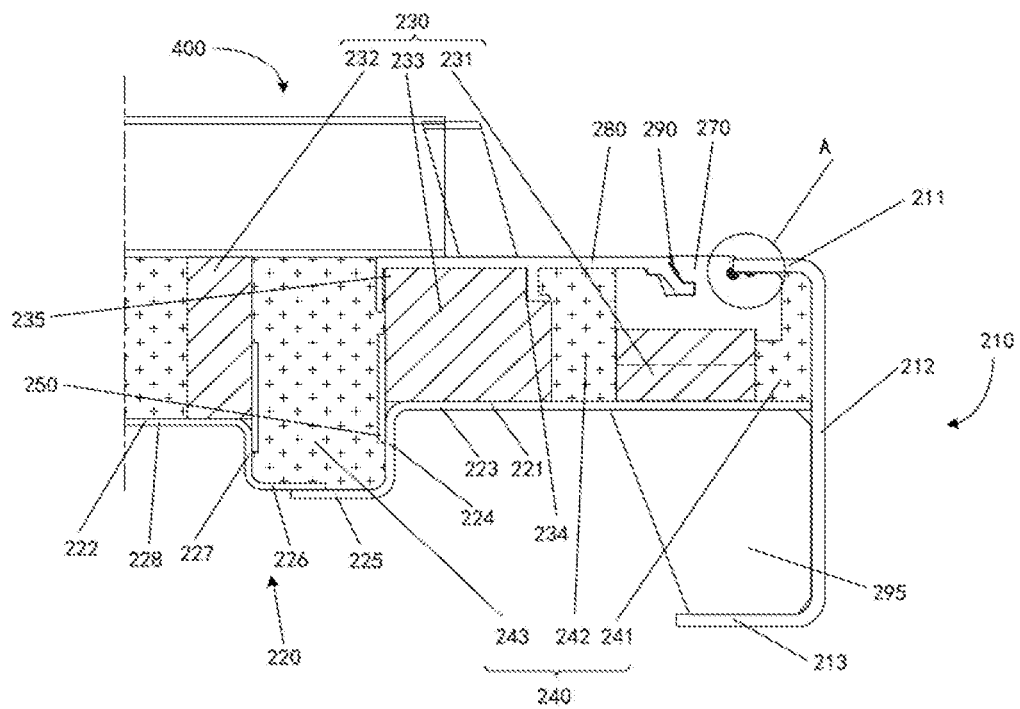
FIG. 1 is a front cross section view of a threshold assembly according to one preferred embodiment of the present invention.

| Description of reference numerals: | |
| --- | --- |
| 100: container; | 200: threshold assembly; |
| 210: outer end plate; | 211: first end bending edge; |
| 212: second end bending edge; | 213: third end bending edge; |
| 220: bottom plate; | 221: first bottom plate; |
| 222: second bottom plate; | 223: first bottom bending edge; |
| 224: second bottom bending edge; | 225: third bottom bending edge; |
| 226: fourth bottom bending edge; | 227: fifth bottom bending edge; |
| 228: sixth bottom bending edge; | 230: cushion block; |
| 231: first cushion block; | 232: second cushion block; |
| 233: third cushion block; | 234: middle limiting portion; |
| 240: thermal insulation material; | 241: first thermal insulation material; |
| 242: second thermal insulation material; | 243: third thermal insulation material; |
| 270, 570: middle connecting member; | 271, 671: clamping groove; |
| 272: first concave portion; | 273: second concave portion; |
| 274: first protrusion; | 275, 575, 675: first step portion; |
| 276, 676: first corner portion; | 277: sealing portion; |
| 278, 578: inclined portion; | 279: hook portion; |
| 280, 580: horizontal connecting member; | 281: body; |
| 250: steel angle bar; | 283, 683: inserting portion; |
| 284: end clamping portion; | 285: middle clamping portion; |
| 286, 686: second step portion; | 287, 687: second corner portion; |
| 288: second protrusion; | 290: elastic sealing member; |

| Description of reference numerals: | |
| --- | --- |
| 291: elastic member; | 292: sealing member; |
| 293, 593: inclined section; | 294: horizontal extension section; |
| 295: sealing plate; | 300: door end; |
| 400: floor; | 235: end limiting portion. |

DETAILED DESCRIPTION

In the following description, numerous specific details are provided to understand the present invention more thoroughly. However, it is apparent to those skilled in the art that the present invention may be implemented without one or more of these details. In other instances, some technical features well known in the art are not described in order to avoid the confusion with the present invention.

In order to thoroughly understand the present invention, detailed structures are provided in the following description to illustrate the present invention. Obviously, the implementation of the present invention is not limited to the special details familiar to those skilled in the art. The preferred embodiments of the present invention are described in detail as follows, however, in addition to these detailed descriptions, the present invention may also have other embodiments, and should not be construed as being limited to the embodiments set forth herein.

It should be understood that the terms used herein are merely used to describe particular embodiments and are not intended to limit the present invention. "a/an", "one" and "the/said" in a singular form are also intended to include the plural forms unless the context clearly indicates other ways. When the terms "include" and/or "comprise" are used in this description, they indicate the presence of the features, integers, steps, operations, elements and/or components, but do not exclude the presence or addition of one or more other features, integers, steps, operations, elements, components and/or combinations thereof. The terms "up", "down", "front", "rear", "left", "right" and the like used in the present invention are for illustrative purposes only, and are not meant to limit the present invention.

The ordinal numbers such as "first" and "second" cited in the present invention are merely identifiers, and do not have any other meanings, such as a specific order, etc. Moreover, for example, the term "first component" does not imply the existence of "second component", and the term "second component" does not imply the existence of "first component".

The particular embodiments of the present invention will be described in more detail below with reference to the accompanying drawings, which illustrate representative embodiments of the present invention rather than limit the present invention.

Figure 11:
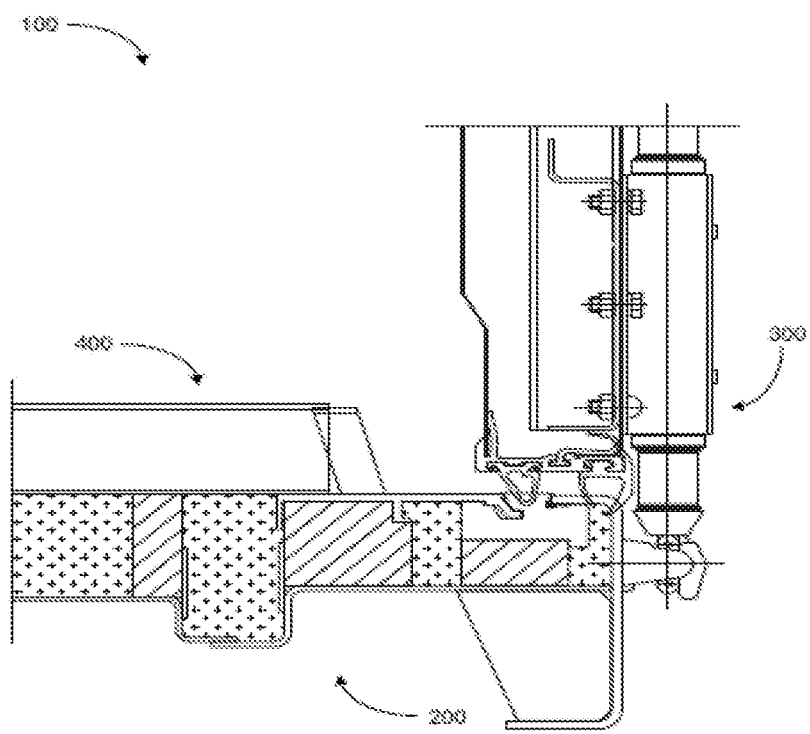
FIG. 11 is a partial cross section view of a container according to one preferred embodiment of the present invention.

As shown in FIG. 11, the present invention provides a threshold assembly 200 for a container 100. The threshold assembly 200 is arranged at a door end 300 of the container 100. As shown in FIG. 1, the threshold assembly 200 comprises an outer end plate 210, a bottom plate 220, a cushion block 230, a thermal insulation material 240, the steel angle bar 250, a middle connecting member 270, and a horizontal connecting member 280. The outer end plate 210 is located at one end of the threshold assembly 200 toward an outer side of the container 100. The outer end plate 210 may be made of steel or iron such that the outer end plate 210 may have sufficient strength to support a forklift (not shown in the FIGS.) above the outer end plate 210. The outer end plate 210 is configured to be C-shaped, and comprises a horizontal portion and a vertical portion. Particularly, the outer end plate is provided with a first end bending edge 211, a second end bending edge 212, and a third end bending edge 213. The first end bending edge 211 is the horizontal portion. The second end bending edge 212 is the vertical portion, and is arranged vertically downward at one end of the threshold assembly 200 toward an outer side of the container from an outer side of the first end bending edge 211. Further, the third end bending edge 213 is perpendicular to the second end bending edge 212 and extends from the bottom end of the second end bending edge 212 toward a middle position of the container.

Figure 4:
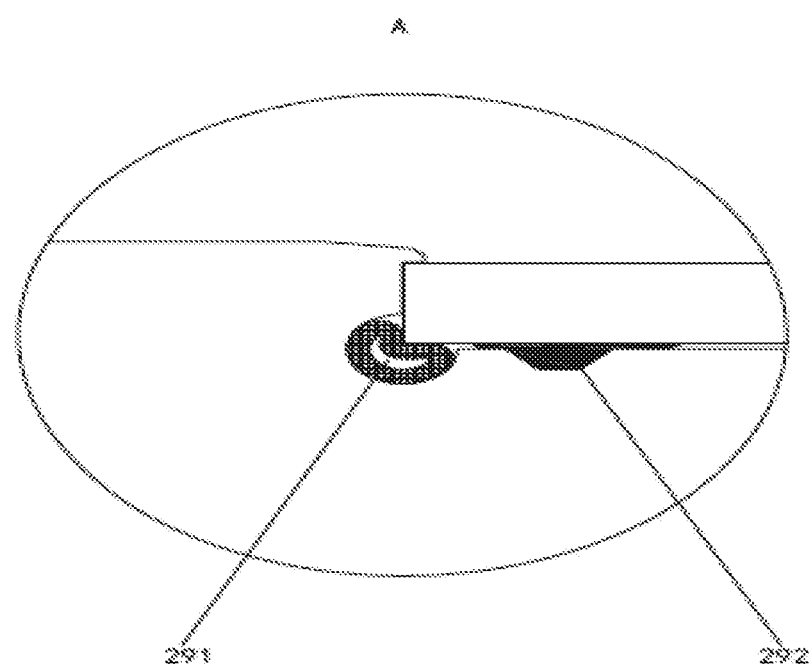
FIG. 4 is a partial enlarged view of a portion A shown in FIG. 1.

The middle connecting member 270 is connected to the first end bending edge 211. An elastic sealing member 290 is arranged at a position where the middle connecting member 270 is abutted against the outer end plate 210 for sealing connection the middle connecting member 270 and the first end bending edge 211 at the position. As shown in FIG. 4, the elastic sealing member 290 comprises an elastic member 291 and a sealing member 292. The elastic member 291 can be elastically deformed, and may be a hollow rubber strip, a solid rubber strip, or components having other structures and being elastically deformed. The sealing member 292 may be a sealing strip or a sealant so as to connect the middle connecting member 270 and the first end bending edge 211 in a sealing manner.

Figure 2:
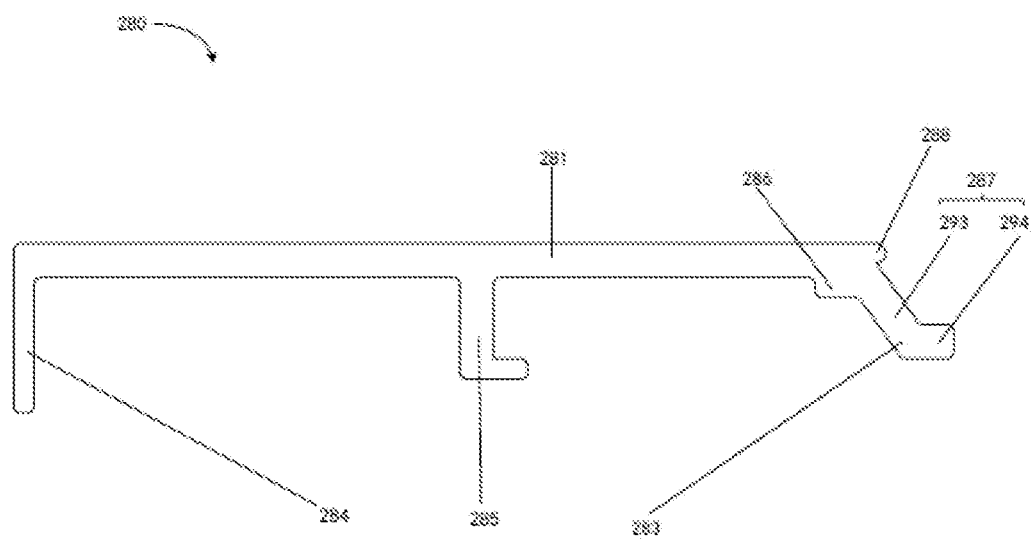
FIG. 2 is a front view of a horizontal connecting member of the threshold assembly shown in FIG. 1.
Figure 3:
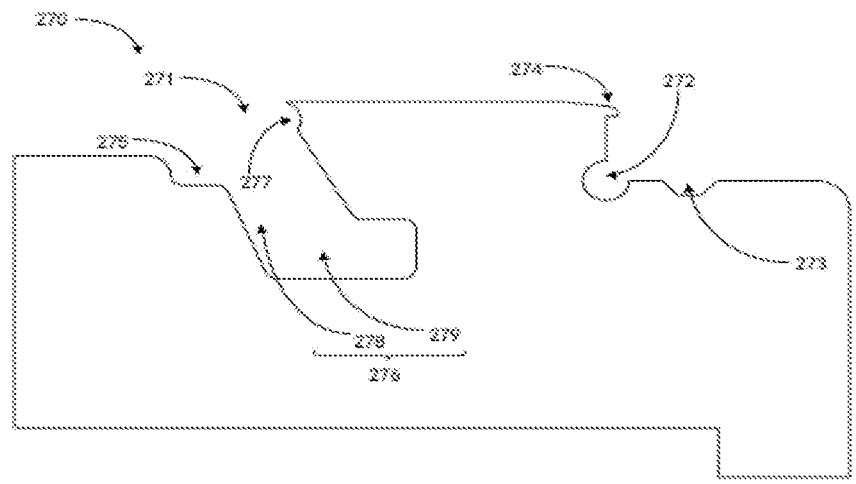
FIG. 3 is a front view of a middle connecting member of the threshold assembly shown in FIG. 1.

As shown in FIG. 3, the middle connecting member 270 comprises an inserting opening, a clamping groove 271, a first concave portion 272, a second concave portion 273, and a first protrusion 274. The inserting opening is located at the top of the middle connecting member 270 and is open; one end of the horizontal connecting member 280 (see FIGS. 1 and 2) in the horizontal direction is inserted into the clamping groove 271 through the inserting opening and is connected to the clamping groove 271, and the other end of the horizontal connecting member 280 is connected to a floor of the container 100. The middle connecting member 270 is made of polyvinyl chloride and has a certain structural strength and supporting strength, so that the middle connecting member 270 is prevented from being easily damaged when being rolled by the forklift.

The clamping groove 271 is configured to have an approximately L-shaped vertical cross section. Particularly, the clamping groove 271 comprises a first step portion 275, a first corner portion 276, and a sealing portion 277; the first step portion 275 is communicated with a first corner portion 276; and the sealing portion 277 is communicated with the first corner portion 276. One end of the first corner portion 276 enables the horizontal connecting member 280 to be inserted. The first step portion 275 is located at the top of the middle connecting member 270 and is arranged above the other end of the first corner portion 276. When the inserting portion 283 of the horizontal connecting member 280 (see FIGS. 1 and 2) is fully inserted into the clamping groove 271, the first step portion 275 prevents the horizontal connecting member 280 from moving. The first corner portion 276 comprises an inclined portion 278 and a hook portion 279 which is communicated with the inclined portion 278; and the inclined portion 278 is communicated with the outer side of the middle connecting member 270. The first step portion 275 laterally protrudes from the inclined portion 278 to limit lateral movement of the inserting portion 283 of the horizontal connecting member 280. The inclined portion 278 is inclined downward and toward the outer end plate from the inserting opening; and the hook portion 279 extends substantially horizontally from a lower end of the inclined portion 278. The inclined portion 278 may comprise a first step portion 275. The inclination angle of the inclined portion 278 can enable the inserting portion 283 of the horizontal connecting member 280 to fully inserted, so that the horizontal connecting member 280 can be stably connected to the clamping groove 271. In this way, a body 281 of the horizontal connecting member 280 can be closely abutted on the top of the middle connecting member 270, and there is no inclination angle between the body 281 of the horizontal connecting member 280 and the top of the middle connecting member 270, thus the other end of the horizontal connecting member 280 is prevented from being tilted up. The hook portion 279 cooperates with the inserting portion 283 of the horizontal connecting member 280, so that the inserting portion 283 of the horizontal connecting member 280 is tightly connected to the hook portion 279. Therefore, the horizontal connecting member 280 and the clamping grooves 271 do not swing after being connected to each other, thereby avoiding non-stability of the horizontal connecting member 280. Of course, the first corner portion 276 may not comprise the hook portion 279. One end of the horizontal connecting member 280 may be stably connected to the inclined portion 278, so that the body 281 of the horizontal connecting member 280 can be closely attached to the top of the middle connecting member 270. There is no inclination angle between the body 281 of the horizontal connecting member 280 and the top of the middle connecting member 270, thus the other end of the horizontal connecting member 280 is prevented from being tilted up. In a height direction of the container 100, the sealing portion 277 is located at the top of the middle connecting member 270 and is arranged above the first corner portion 276. The sealing portion 277 may be configured to be arc-shaped. A sealing strip or a sealant may be arranged in the sealing portion 277. When one end of the horizontal connecting member 280 is fully inserted into the first corner portion 276 and the body 281 of the horizontal connecting member 280 is closely attached to the top of the middle connecting member 270, the horizontal connecting member 280 may be stably connected to the middle connecting member 270 through the sealing strip or the sealant arranged in the sealing portion 277.

Referring to FIG. 1 again, one end of the middle connecting member 270 in the horizontal direction extends to a position where the horizontal portion and the vertical portion of the outer end plate 210 intersect. That is, one end of the middle connecting member 270 in the horizontal direction extends to a position where the first end bending edge 211 and the second end bending edge 212 intersect. As shown in FIGS. 3 and 4, the first concave portion 272 is configured to be circular, and may be provided with an elastic member 291 therein. When a gap between the first end bending edge 211 and the first concave portion 272 becomes larger, the elastic member 291 may be deformed to become greater, so that the gap between the first end bending edge 211 and the first concave portion 272 is sealed, thereby preventing foreign matters such as dust and water from entering the threshold assembly 200, and avoiding corrosion or rusting of the structure of the threshold assembly 200 caused by the foreign matters such as the dust and water. In addition, deformation or detachment of the structure of the threshold assembly 200 caused by untight connection between the outer end plate 210 and the middle connecting member 270 is also avoided.

The second concave portion 273 is configured to be trapezoidal; and a sealing member 292 is arranged in the second concave portion 273. The seal member 292 may be configured to be trapezoidal to be closely matched with the second concave portion 273 in shape, and is arranged in the second concave portion 273 to sealable connect the first end bending edge 211 and the middle connecting member 270. Of course, the second concave portion 273 may be configured to have other shapes, such as an inverted triangle, a square or a rectangle, which can only make the sealing member 292 tightly connected to the first end bending edge 211. The sealing member 292 may be a sealant. When the middle connecting member 270 is mounted into the outer end plate 210, a glue gun can inject the sealant into the second concave portion 273 to efficiently seal the gap between the middle connecting member 270 and the first end bending edge 211.

A first protrusion 274 is further arranged at the top of the middle connecting member 270, and is arranged above the first concave portion 272. As shown in FIG. 1, when the middle connecting member 270 is connected to the first end bending edge 211, the first protrusion 274 is located above the first end bending edge 211, so that the middle connecting member 270 wraps an end of the first end bending edge 211 in contact with the middle connecting member 270. In this way, when the forklift travels on the threshold assembly 200, tires directly roll the middle connecting member 270 instead of the end of the first end bending edge 211, so that the end of the first end bending edge 211 is protected, the service life of the connecting member 270 and the outer end plate 210 is prolonged, a possibility of forming a gap between the middle connecting member 270 and the first end bending edge 211 is reduced, and dust or water is prevented from falling into a connection position between the middle connecting member 270 and the outer end plate 210.

As the forklift always travels on the threshold assembly 200, the gap between the first end bending edge 211 and the middle connecting member 270 is likely to become larger under the action of the frictional force of the forklift in travelling, thereby exposing the first concave portion 272. The elastic member 291 may be elastically deformed to prevent the first concave portion 272 from being exposed. When the gap at the connection position between the first end bending edge 211 and the middle connecting member 270 becomes larger, the elastic member 291 is elastically deformed to become larger accordingly. When the gap at the connection position between the first end bending edge 211 and the middle connecting member 270 becomes smaller, the elastic member 291 is elastically deformed to become smaller accordingly. Thus, the elastic member 291 can be changed along with the change of the size of the gap between the first end bending edge 211 and the middle connecting member 270, so that the elastic member 291 and the sealing member 292 seal the gap between the first end bending edge 211 and the middle connecting member 270 all the time to prevent dust or water from falling into the interior of the threshold assembly 200.

As shown in FIG. 2, the horizontal connecting member 280 is made of aluminum, is light in weight and resistant to corrosion, and has sufficient supporting strength. The horizontal connecting member 280 comprises a body 281, an inserting portion 283, an end clamping portion 284, and a middle clamping portion 285. The body 281 can be configured as a flat plate; and the body 281 is matched with the top of the middle connecting member 270 in shape, so that the body 281 and the middle connecting member 270 can be tightly connected to avoid a large gap therebetween. The inserting portion 283 is configured to match the clamping groove 271, and can be inserted into the clamping groove 271.

The inserting portion 283 comprises a second step portion 286, a second corner portion 287, and a second protrusion 288. The second step portion 286 is configured to match the first step portion 275; the inserting portion 283 is inserted into the clamping groove 271; and the first step portion 275 is abutted against the second step portion 286, and prevents the lateral movement of the second step portion 286. The lateral direction may coincide with the length direction of the container. The second corner portion 287 is configured to match the first corner portion 276; and the second corner portion 287 can be obliquely inserted into the first step portion 275 and can be inserted into the first corner portion 276, so that the body 281 is closely abutted on the top of the middle connecting member 270. The second corner portion 287 comprises an inclined section 293 and a horizontal extension section 294 which is connected to the inclined section 293. With its inclination angle, the inclined section 293 can be inserted into the inclined portion 278, so that the inserting portion 283 can be stably connected to the clamping groove 271. The body 281 can be closely abutted on the top of the middle connecting member 270, and there is no inclination angle between the body 281 and the top of the middle connecting member 270, thus the end clamping portion 284 is prevented from being tilted up. The end clamping portion 284 may be configured as an L-shaped protrusion structure. The horizontal extension section 294 cooperates with the hook portion 279, so that the horizontal extension section 294 is tightly connected to the hook portion 279. Therefore, the inserting portion 283 and the clamping groove 271 do no swing after being connected to each other, thereby avoiding non-stability of the horizontal connecting member 280. Of course, the second corner portion 287 may not comprise the horizontal extension section 294. The inclined section 293 may be stably connected to the inclined portion 278, so that the body 281 can be closely abutted on the top of the middle connecting member 270, and there is no inclination angle between the body 281 and the top of the middle connecting member 270, thus the end clamping portion 284 is prevented from being tilted up.

In the height direction of the container 100, the second protrusion 288 is located at the top of the horizontal connecting member 280 and is arranged above the second corner portion 287. The second protrusion 288 may be configured to be arc-shaped. The second protrusion 288 is configured to match the sealing portion 277. When the inserting portion 283 is fully inserted into the clamping groove 271 and the body 281 of the horizontal connecting member 280 is closely abutted on the top of the middle connecting member 270, the second protrusion 288 and the sealing portion 277 are tightly connected as a sealing strip or sealant is arranged in the sealing portion 277 so as to prevent dust or water from entering the connection position between the horizontal connecting member 280 and the middle connecting member 270.

Figure 9:
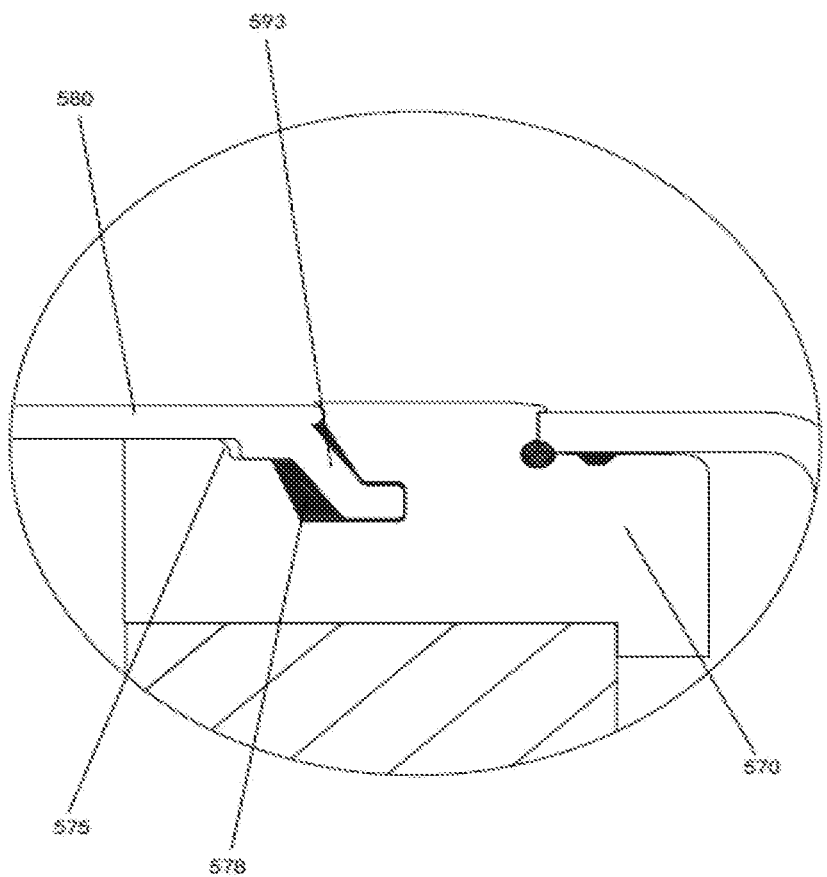
FIG. 9 is a partial enlarged view of a threshold assembly according to another preferred embodiment of the present invention.
Figure 10:
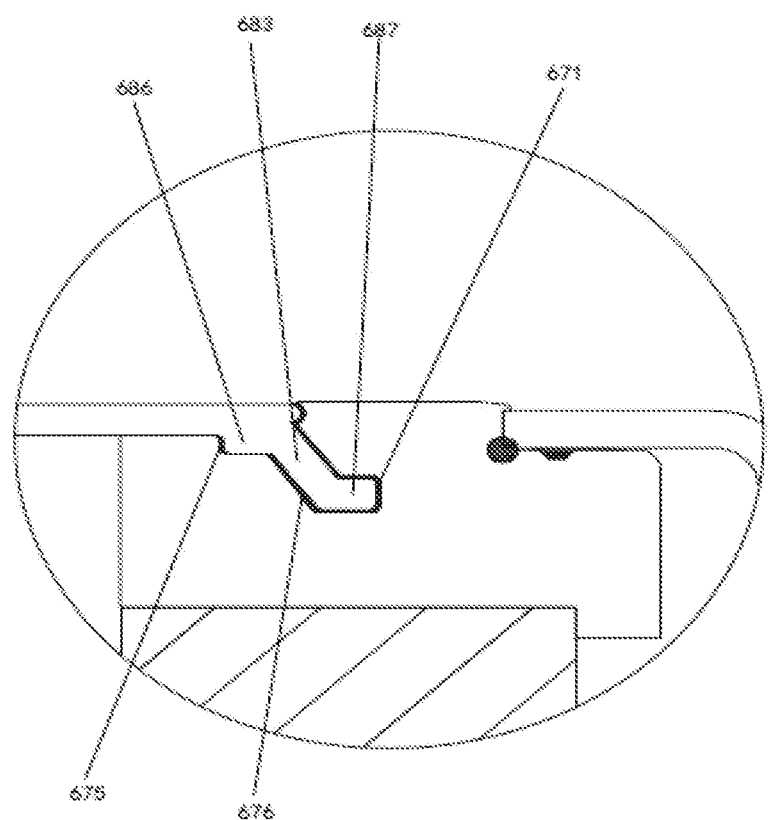
FIG. 10 is a partial enlarged view of a threshold assembly according to a third preferred embodiment of the present invention.

In order to ensure the tight connection between the horizontal connecting member 280 and the middle connecting member 270, as shown in FIG. 1, in the height direction of the container 100, below the second protrusion 288 and the sealing portion 277, a part of the inclined section 293 is connected to a part of the inclined portion 278 through a sealant, and the horizontal extension section 294 is connected to hook portion 279 through a sealant. Further, as shown in FIG. 9, in another embodiment, below the first step portion 575, another part of the inclined section 593 and another part of the inclined portion 578 may also be connected through a sealant, in order to improve the sealing performance at the connection position of the horizontal connecting member 580 and the middle connecting member 570. More further, as shown in FIG. 10, in the third embodiment, the inserting portion 683 and the clamping groove 671 may be closely attached; a sealant may be arranged between the first step portion 675 and the second step portion 686 and between the first corner portion 676 and the second corner portion 687 to realize sealing connection between the inserting portion 683 and the clamping groove 671.

A manner in that the inserting portion 283 is inserted into the clamping groove 271 will now be described below.

Figure 5:
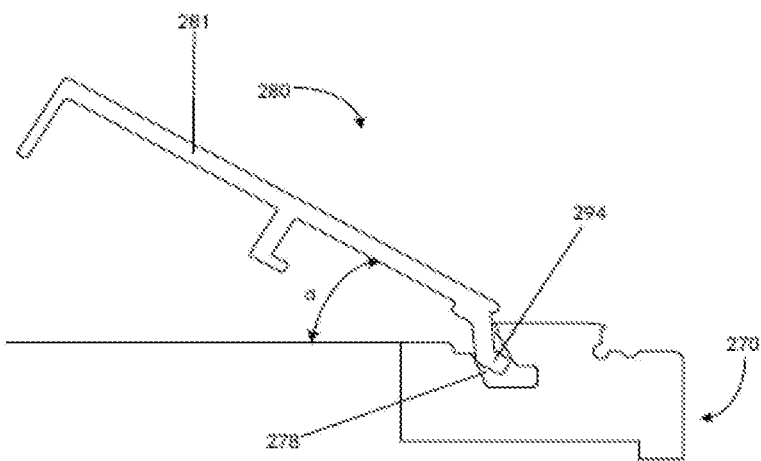
FIG. 5 is a schematic view showing the connection between the horizontal connecting member and the middle connecting member of the threshold assembly shown in FIG. 1, wherein a horizontal extension section is in a first position.
Figure 6:
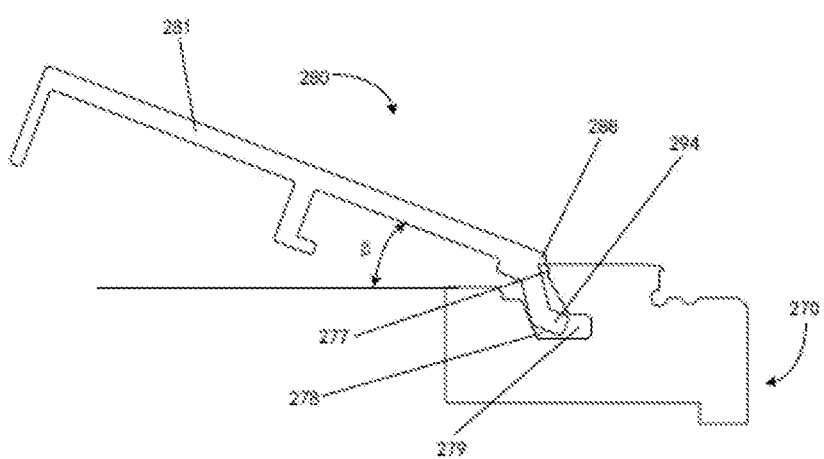
FIG. 6 is a schematic view showing the connection between the horizontal connecting member and the middle connecting member of the threshold assembly shown in FIG. 1, wherein the horizontal extension section is in a second position.
Figure 7:
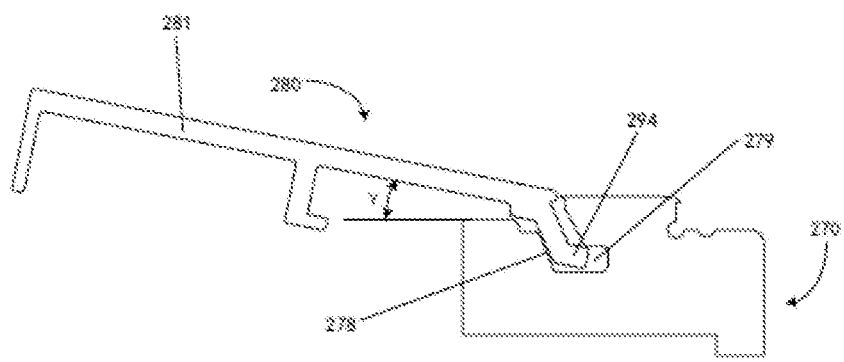
FIG. 7 is a schematic view showing the connection between the horizontal connecting member and the middle connecting member of the threshold assembly shown in FIG. 1, wherein the horizontal extension section is in a third position.
Figure 8:
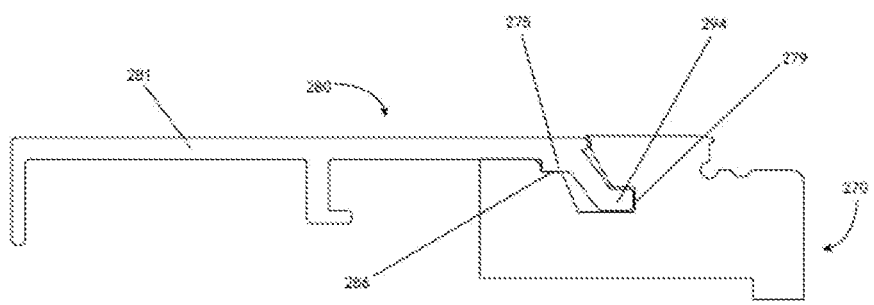
FIG. 8 is a schematic view showing the connection between the horizontal connecting member and the middle connecting member of the threshold assembly shown in FIG. 1, wherein the horizontal extension section is in a fourth position.

The horizontal connecting member 280 is obliquely inserted into the middle connecting member 270. As shown in FIG. 5, when the horizontal extension section 294 is at the first position, the horizontal extension section 294 enters the inclined portion 278 and is abutted against the surface of the inclined portion 278; and an angle α is formed between the body 281 of the horizontal connecting member 280 and the top surface of the middle connecting member 270. As shown in FIG. 6, when the horizontal extension section 294 is at the second position, the horizontal extension section 294 enters the hook portion 279. The second protrusion 288 is abutted against the sealing portion 277; the horizontal extension section 294 is abutted against the surface of the inclined portion 278; and an angle β is formed between the body 281 of the horizontal connecting member 280 and the top surface of the middle connecting member 270. As shown in FIG. 7, when the horizontal extension section 294 is at the third position, the horizontal extension section 294 is not abutted against the surface of the inclined portion 278; the horizontal extension section 294 further enters the hook portion 279 toward the outer side of the container 100; and an angle γ is formed between the body 281 of the horizontal connecting member 280 and the top surface of the middle connecting member 270. As shown in FIG. 8, when the horizontal extension section 294 is at the fourth position, the horizontal extension section 294 fully enters the hook portion 279; the second step portion 286 is abutted against the first step portion 275; and the body 281 of the horizontal connecting member 280 is closely abutted on the top surface of the middle connecting member 270, and an angle between the body 281 of the horizontal connecting member 280 and the top surface of the middle connecting member 270 is approximately 0°. In the present embodiment, $\alpha > \beta > \gamma > 0°$. In this way, the horizontal connecting member 280 can be smoothly inserted into the middle connecting member 270.

Referring back to FIG. 1, the outer end plate 210 is connected to the bottom plate 220. The bottom plate 220 comprises a first bottom plate 221 and a second bottom plate 222. Each of the first bottom plate 221 and the second bottom plate 222 may be configured to be Z-shaped. The first bottom plate 221 comprises a first bottom bending edge 223, a second bottom bending edge 224, and a third bottom bending edge 225. One end of the bottom plate 220 in the length direction of the container 100 is connected to the outer end plate 210; the first bottom bending edge 223 extends in the length direction of the container 100; and one end of the first bottom bending edge 223 is perpendicularly connected to the second end bending edge 212. The second bottom bending edge 224 extends vertically downward in the height direction of the container 100 from the other end of the first bottom bending edge 223. One end of the third bottom bending edge 225 is connected to the bottom end of the second bottom bending edge 224; and the third bottom bending edge 225 extends toward the middle position of the container 100 in the length direction of the container 100. Of course, the first bottom bending edge 223 may also extend in the width direction of the container 100; and the third bottom bending edge 225 may also extend toward the middle position of the container 100 in the width direction of the container 100. The second bottom plate 222 comprises a fourth bottom bending edge 226, a fifth bottom bending edge 227 and a sixth bottom bending edge 228. One end of the fourth bottom bending edge 226 is connected to the other end of the third bottom bending edge 225. The fifth bottom bending edge 227 extends upward in the height direction of the container 100 from the other end of the fourth bottom bending edge 226; and the sixth bottom bending edge 228 extends toward the middle position of the container 100 in the length direction of the container 100 from the top of the fifth bottom bending edge 227.

The container 100 further comprises a floor 400. The floor 400 is arranged above the horizontal connecting member 280, and may be a T floor which is stable in structure and high in strength and which can bear the weight of the forklift without deformation. The horizontal connecting member 280 is connected to the middle connecting member 270; the middle connecting member 270 is connected to the outer end plate 210; and the bottom plate 220 is also connected to the outer end plate 210. There is a certain distance between the bottom plate 220 and the horizontal connecting member 280 and between the bottom plate 220 and the middle connecting member 270, so that a chamber is formed by the horizontal connecting member 280, the middle connecting member 270, the outer end plate 210, and the bottom plate 220. Cushion blocks 230 and thermal insulation materials 240 are arranged in the chamber. The cushion blocks 230 comprise a first cushion block 231, a second cushion block 232, and a third cushion block 233 which are spaced apart in the length direction of the container 100. Of course, the first cushion block 231, the second cushion block 232, and the third cushion block 233 may also be spaced apart in the width direction of the container 100. The cushion blocks 230 are made of polyethylene which is excellent in low temperature resistance and chemical stability, and is resistant to corrosion of most acids and alkalis. Particularly, in the height direction of the container 100, the first cushion block 231 is arranged below the middle connecting member 270 for supporting the middle connecting member 270. A third concave portion is arranged at the bottom of the middle connecting member 270 to receive the first cushion block 231. In this way, the middle connecting member 270 is prevented from moving in the length direction of the container 100 under the action of the frictional force of the forklift in travelling. The second cushion block 232 is arranged between the bottom plate 220 and the floor 400 for supporting the floor 400. The third cushion block 233 is arranged between the horizontal connecting member 280 and the bottom plate 220 for supporting the horizontal connecting member 280. The middle clamping portion 285 is configured as an L-shaped protrusion structure (as shown in FIG. 2), and the middle clamping portion 285 may be configured as a hook having a horizontal section and a vertical section. The top of the third cushion block 233 comprises a middle limiting portion 234 and an end limiting portion 235. Both the end limiting portion 235 and the middle limiting portion 234 are configured as L-shaped stepped structures. The middle limiting portion 234 comprises a horizontal step section and a vertical step section. The horizontal section of the hook is arranged in the horizontal step section of the middle limiting portion 234, so that the middle limiting portion 234 supports the middle clamping portion 285. The vertical step section is abutted against the vertical section of the hook, so that the middle limiting portion 234 can prevent the horizontal connecting member 280 from moving and deforming in the length direction of the container 100 under the action of the frictional force of the forklift in travelling. The end clamping portion 284 is connected to the end limiting portion 235 of the third cushion block 233 through a fastener, so that the third cushion block 233 can further prevent the horizontal connecting member 280 from moving in the length direction of the container 100 under the action of the frictional force of the forklift in travelling.

The thermal insulation materials 240 comprise a first thermal insulation material 241, a second thermal insulation material 242, and a third thermal insulation material 243. The first thermal insulation material 241, the second thermal insulation material 242, and the third thermal insulation material 243 are spaced apart in the length direction of the container 100. The first thermal insulation material 241 is arranged in a chamber formed by the middle connecting member 270, the first cushion block 231, the outer end plate 210 and the bottom plate 220 to seal the chamber formed by the middle connecting member 270, the first cushion block 231, the outer end plate 210 and the bottom plate 220. The first thermal insulation material 241 is made by polyurethane foam, to reduce a possibility of the heat bridge generated at the threshold assembly 200 and thus reduce heat leakage. The polyurethane foam has certain viscosity, so that the middle connecting member 270, the first cushion block 231, the outer end plate 210 and the bottom plate 220 are connected together through the first thermal insulation material 241. The second thermal insulation material 242 is arranged in a chamber formed by the middle connecting member 270, the horizontal connecting member 280, the first cushion block 231, the third cushion block 233, and the bottom plate 220 to seal the chamber formed by the middle connecting member 270, the horizontal connecting member 280, the first cushion block 231, the third cushion block 233, and the bottom plate 220. The second insulation material 242 is polyurethane foam to reduce a possibility of the heat bridge generated at the threshold assembly 200 and thus reduce heat leakage. The polyurethane foam has certain viscosity, so that the middle connecting member 270, the horizontal connecting member 280, the first cushion block 231, the third cushion block 233, and the bottom plate 220 are connected together through the second thermal insulation material 242. The third thermal insulation material 243 is arranged in a chamber formed by the second cushion block 232, the horizontal connecting member 280, the floor 400, the third cushion block 233, and the bottom plate 220 to seal the chamber formed by the second cushion block 232, the horizontal connecting member 280, the floor 400, the third cushion block 233, and the bottom plate 220. The third thermal insulation material 243 is polyurethane foam to reduce a possibility of the heat bridge generated at the threshold assembly 200 and thus reduce heat leakage. The polyurethane foam has certain viscosity, so that the second cushion block 232, the horizontal connecting member 280, the floor 400, the third cushion block 233, and the bottom plate 220 are connected through the third thermal insulation material 243.

Further, the steel angle bar 250 is further arranged in the chamber, is located between the third thermal insulation material 243 and the third cushion block 233, and is connected to the third cushion block 233, so that the cushion block 233 is compressed in a direction toward the outer side of the container 100. During assembling of the threshold assembly 200, the steel angle bar 250 applies a pushing force to the third cushion block 233 in the direction toward the outer side of the container 100, so that the third cushion block 233, the second thermal insulation material 242, the first cushion block 231, the first thermal insulation material 241 and the outer end plate 210 be connected more tightly. More further, the threshold assembly 200 further comprises a sealing plate 295 which is arranged below the bottom plate 220 in the height direction of the container 100. The top end of the sealing plate 295 in the height direction of the container is connected to the lower surface of the bottom plate 220, and the bottom end of the sealing plate 295 is connected to the inner surface of the outer end plate 210, so that the sealing plate 295 can support the bottom plate 220.

According to the threshold assembly 200 of the present invention, an elastic member 291 and a sealing member 292 are arranged between the middle connecting member 270 and the outer end plate 210, so that a gap between the middle connecting member 270 and the outer end plate 210 is widened when the forklift applies a frictional force to the threshold assembly 200. Then, the elastic member 291 is elastically deformed to seal the gap between the middle connecting member 270 and the outer end plate 210, thereby preventing water or other liquid from penetrating into the interior of the threshold assembly 200 to avoid corrosion of steel. The threshold assembly 200 of the disclosure is simple to mount during on-site construction; the heat bridge at the threshold assembly 200 is relatively smaller, and thus the heat leakage is relatively lower; and the horizontal connecting member 280 and the middle connecting member 270 are mounted in a clamping manner, and form an anti-disengagement structure after being rotatably mounted in position.

The present invention further discloses a container 100 comprising the above threshold assembly 200 and the floor 400. The container may be a refrigerated container or an insulated container. According to the container 100 of the disclosure, the forklift travels on the threshold assembly 200, the heat bridge will not be generated between the interior and the exterior of the container, thereby avoiding heat leakage of the container 100, and improving the performance of the container 100.

The assembling of the threshold assembly is as follows.

The outer end plate 210 is placed on a tooling table and is fixed. One end of the bottom plate 220 in the length direction of the container 100 is connected to the middle position of the outer end plate 210. The elastic sealing member 290 comprises the elastic member 291 and the sealing member 292. The middle connecting member 270 comprises the clamping groove 271, the first concave portion 272, and the second concave portion 273. The elastic member 291 is arranged in the first concave portion 272.

The sealing member 292 is arranged in the second concave portion 273 of the middle connecting member 270 to sealable connect the middle connecting member 270 and the outer end plate 210. In the height direction of the container 100, the first cushion block 231 is arranged below the middle connecting member 270, and the first cushion block 231 is located between the middle connecting member 270 and the bottom plate 220. The middle connecting member 270 and the first cushion block 231 are stacked together and are placed in the chamber between the outer end plate 210 and the bottom plate 220. The middle connecting member 270 and the first cushion block 231 are fixed between the outer end plate 210 and the bottom plate by knocking with a rubber hammer. The sealing member 292 arranged in the second concave portion 273 connects the middle connecting member 270 and the outer end plate 210 together.

A sealant is arranged in the clamping groove 271, and one end of the horizontal connecting member 280 is obliquely placed into the clamping groove 271. The body 281 of the horizontal connecting member 280 is closely abutted on the top of the middle connecting member 270; and the middle connecting member 270 is connected to the horizontal connecting member 280 through the sealant arranged in the clamping groove 271. In the process that the body 281 of the horizontal connecting member 280 is closely abutted on the top of the middle connecting member 270, first, the inserting portion 283 of the horizontal connecting member 280 is placed in the clamping groove 271, and an angle is formed between the body 281 and the top of the middle connecting member 270; and the inserting portion 283 moves toward the outer side of the container 100 in the length direction of the container 100 and enters the hook portion 279 via the inclined portion 278 of the middle connecting member 270 until the horizontal extension section 294 of the inserting portion 283 is fully abutted against the hook portion 279. The first step portion 275 is arranged in the clamping groove 271, and can prevent the horizontal connecting member 280 from moving in the length direction of the container 100, thereby avoiding gaps between adjacent two of the horizontal connecting member 280, the middle connecting member 270, and the outer end plate 210.

The horizontal connecting member 280 is connected to the middle connecting member 270; and a chamber is formed between the horizontal connecting member 280 and the bottom plate 220. A third cushion block 233 is arranged below the horizontal connecting member 280 in the height direction of the container 100. The third cushion block 233 is inserted from the side of the bottom of the container 100 toward the middle position of the container 100 in the width direction of the container 100. The third cushion block 233 is located between the bottom plate 220 and the horizontal connecting member 280 to support the horizontal connecting member 280.

Spaces generated after the horizontal connecting member 280, the middle connecting member 270, the outer end plate 210 and the bottom plate 220 are connected together are filled with a thermal insulation material 240 which may be polyurethane foam, so that the possibility of the heat bridge generated at the threshold assembly 200 is reduced, thereby reducing the heat leakage.

The assembled threshold assembly 200 is placed on a tooling station, and the floor 400 is overlapped with the assembled threshold assembly 200.

Unless otherwise defined, the technical and scientific terms used herein have the same meaning as those commonly understood by those skilled in the technical field of the present invention. The terms used herein is for the purpose of describing specific implementations only and is not intended to limit the present invention. Terms such as "component", "member" and the like herein can represent a single part or a combination of plurality parts. Terms such as "mount", "arrange" and the like herein may mean that one component is directly attached to another component, or one component is attached to another component through a middle component. Features described in one embodiment herein may be applied to another embodiment separately or in combination with other features, unless they are not applicable to another embodiment or otherwise stated.

The present invention has been explained by the above embodiments, but it should be understood that the above embodiments are merely for the purpose of illustration and explanation rather than limiting the present invention within the scope described thereby. It will be appreciated by those skilled in the art that the present invention is not limited to the above embodiments, various transformations and modifications can be further made in accordance with the teachings of the present invention. These transformations and modifications are within the scope of the present invention as claimed. The scope of the present invention is defined by the appended claims and their equivalents.

The invention claimed is:

1. A threshold assembly at a door end of a container comprising:
    an outer end plate comprising a horizontal portion and a vertical portion which intersect, wherein the outer end plate is at a bottommost portion of the threshold assembly, and wherein the vertical portion is positioned downwards from the horizontal portion towards an outside of the container;
    a horizontal connecting member connected to a floor of the container; and
    a middle connecting member horizontally positioned between the outer end plate and the horizontal connecting member,
    wherein the middle connecting member further comprises a clamping groove, the clamping groove comprising a top opening and a middle inclined portion, and a horizontal hook portion at an end distal from the top opening; and
    wherein the horizontal connecting member comprises an inserting portion complementary to the clamping groove, so as to allow the inserting portion to be inserted into the clamping groove and thereby mate the horizontal connecting member to the middle connecting member.

2. The threshold assembly according to claim 1,
    wherein the clamping groove is configured to have an approximately L-shaped vertical cross section, and the middle inclined portion is inclined downward and toward the outer end plate from the top opening, and the horizontal hook portion extends from a lower end of the middle inclined portion.

3. The threshold assembly according to claim 2, wherein the clamping groove further comprises a step portion laterally protruding from the inclined portion to limit lateral movement of the inserting portion.

4. The threshold assembly according to claim 3, further comprising a bottom plate, wherein the bottom plate, the outer end plate, the horizontal connecting member and the middle connecting member form a chamber.

5. The threshold assembly according to claim 4, further comprising a cushion block which is arranged in the chamber and located between the horizontal connecting member and/or the middle connecting member and the bottom plate to support the horizontal connecting member and/or the middle connecting member.

6. The threshold assembly according to claim 5, wherein the horizontal connecting member further comprises an end clamping portion arranged at the other end opposite to the inserting portion, and a middle clamping portion located at a middle position of the horizontal connecting member; and the cushion block comprises an end limiting portion abutting against the end clamping portion, and a middle limiting portion abutting against the middle clamping portion.

7. The threshold assembly according to claim 6, wherein the end clamping portion and/or the middle clamping portion is configured as an L-shaped protrusion structure; and correspondingly, the end limiting portion and/or the middle limiting portion is configured as an L-shaped stepped structure.

8. The threshold assembly according to claim 7, wherein an elastic sealing member is at least arranged at one position of the middle connecting member abutting against the outer end plate.

9. The threshold assembly according to claim 4, wherein a thermal insulation material is filled among the bottom plate, the outer end plate, the horizontal connecting member and the middle connecting member.

10. A container comprising:
an outer end plate comprising a horizontal portion and a vertical portion which intersect, wherein the outer end plate is at a bottommost portion of the threshold assembly, and wherein the vertical portion is positioned downwards from the horizontal portion towards an outside of the container;
a horizontal connecting member connected to a floor of the container; and
a middle connecting member horizontally positioned between the outer end plate and the horizontal connecting member; wherein the middle connecting member further comprises a clamping groove,
the clamping groove comprising a top opening, a middle inclined portion, and a horizontal hook portion at an end distal from the top opening; and
wherein the horizontal connecting member comprises an inserting portion complementary to the clamping groove, so as to allow the inserting portion to be inserted into the clamping groove and thereby mate the horizontal connecting member to the middle connecting member.

11. The threshold assembly according to claim 10, wherein the clamping groove is configured to have an approximately L-shaped vertical cross section, and the middle inclined portion is inclined downward and toward the outer end plate from the top opening, and the horizontal hook portion extends from a lower end of the middle inclined portion.

12. The threshold assembly according to claim 11, wherein the clamping groove further comprises a step portion laterally protruding from the inclined portion to limit lateral movement of the inserting portion.

13. The threshold assembly according to claim 12, further comprising a bottom plate, wherein the bottom plate, the outer end plate, the horizontal connecting member and the middle connecting member form a chamber.

14. The threshold assembly according to claim 13, further comprising a cushion block which is arranged in the chamber and located between the horizontal connecting member and/or the middle connecting member and the bottom plate to support the horizontal connecting member and/or the middle connecting member.

15. The threshold assembly according to claim 14, wherein the horizontal connecting member further comprises an end clamping portion arranged at the other end opposite to the inserting portion, and a middle clamping portion located at a middle position of the horizontal connecting member; and the cushion block comprises an end limiting portion abutting against the end clamping portion, and a middle limiting portion abutting against the middle clamping portion.

16. The threshold assembly according to claim 15, wherein the end clamping portion and/or the middle clamping portion is configured as an L-shaped protrusion structure; and correspondingly, the end limiting portion and/or the middle limiting portion is configured as an L-shaped stepped structure.

17. The threshold assembly according to claim 16, wherein an elastic sealing member is at least arranged at one position of the middle connecting member abutting against the outer end plate.

18. The threshold assembly according to claim 13, wherein a thermal insulation material is filled among the bottom plate, the outer end plate, the horizontal connecting member and the middle connecting member.

* * * * *